US012704924B2

(12) United States Patent
Koki et al.

(10) Patent No.: US 12,704,924 B2
(45) Date of Patent: Aug. 11, 2026

(54) AUTOMATIC CALIBRATION OF BRAILLE INTERFACE

(71) Applicant: Intel Corporation, Santa Clara, CA (US)

(72) Inventors: Tarakesava Reddy Koki, Telangana (IN); Venkata Mahesh Gunnam, East Godavari (IN); Phani Alaparthi, Bangalore (IN); Venkataramana Kotakonda, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/072,033

(22) Filed: Nov. 30, 2022

(65) Prior Publication Data

US 2023/0090403 A1 Mar. 23, 2023

(51) Int. Cl.
*G06F 3/041* (2006.01)
*G09B 21/02* (2006.01)

(52) U.S. Cl.
CPC ........... *G06F 3/0418* (2013.01); *G09B 21/02* (2013.01); *G06F 2203/04104* (2013.01)

(58) Field of Classification Search
CPC ......... G06F 3/0418; G06F 2203/04104; G09B 21/02
See application file for complete search history.

(56) References Cited

U.S. PATENT DOCUMENTS

| | | | | |
|---|---|---|---|---|
| 10,175,882 | B2 * | 1/2019 | Labbé | G06F 3/0219 |
| 2015/0154003 | A1 * | 6/2015 | Kim | G06F 3/04883 715/729 |
| 2017/0169730 | A1 * | 6/2017 | Choi | G09B 21/02 |
| 2018/0107328 | A1 * | 4/2018 | Seok | G06F 3/0488 |

FOREIGN PATENT DOCUMENTS

| | | | | |
|---|---|---|---|---|
| CN | 106716329 B | * | 3/2020 | G06F 3/016 |
| CN | 107967079 B | * | 3/2022 | G09B 21/004 |

* cited by examiner

*Primary Examiner* — Michael Pervan
(74) *Attorney, Agent, or Firm* — Banner & Witcoff, Ltd.

(57) ABSTRACT

Methods for automatic calibration of a braille interface. In embodiments, a user begins typing braille characters in 2×3 matrix into an interface without an initial calibration step. The implementing system detects the patterns of the keystrokes and determines the orientation and placement of the user's hands by comparing the keystrokes against known braille characters, identifying which row and column of the 2×3 matrix within which each finger is positioned. The interface is then calibrated based on the identified positions of the fingers within the 2×3 matrix. For touch interfaces, the surface area of each finger may also be used to enhance identification of fingers. Other embodiments may be described and/or claimed.

20 Claims, 7 Drawing Sheets

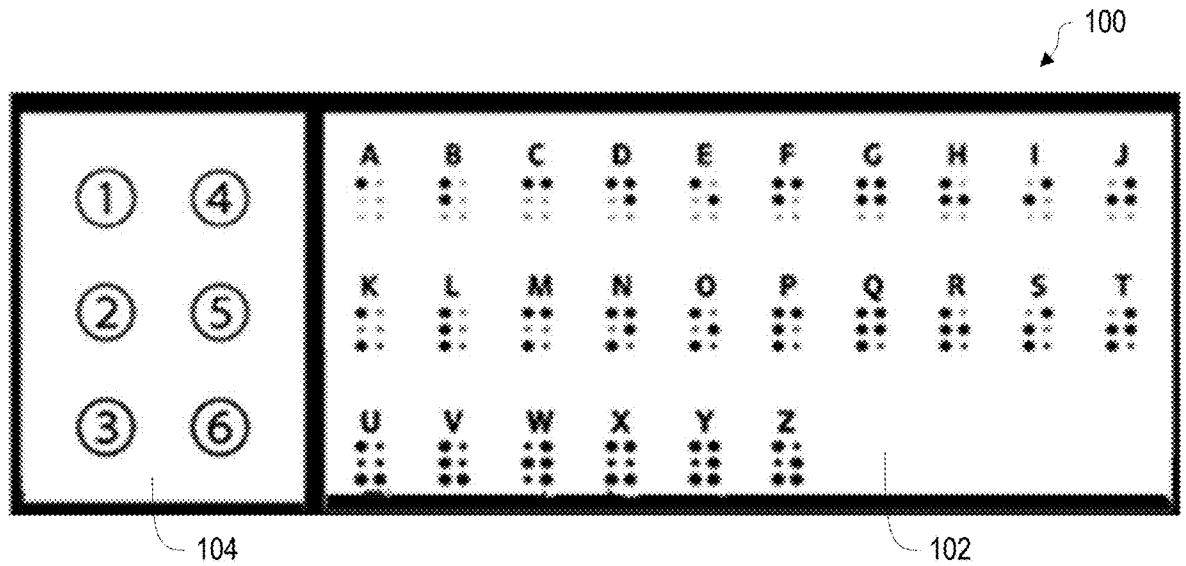
FIG. 1
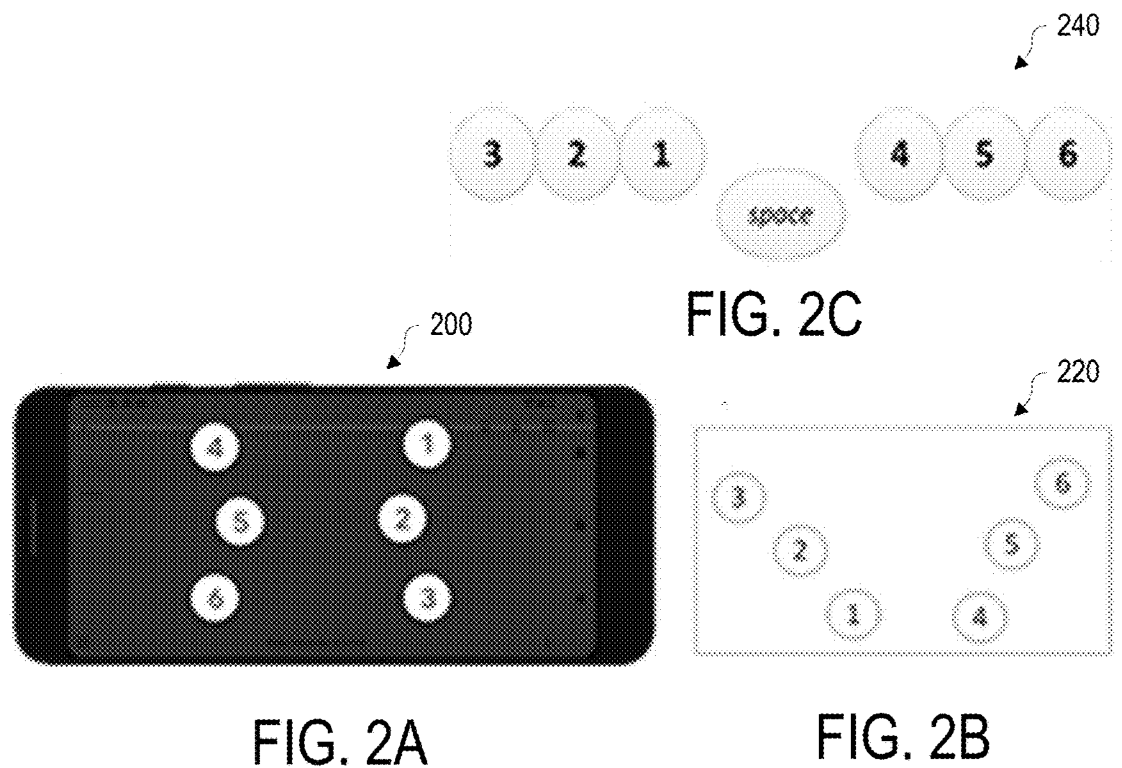
FIG. 2C
FIG. 2A
FIG. 2B

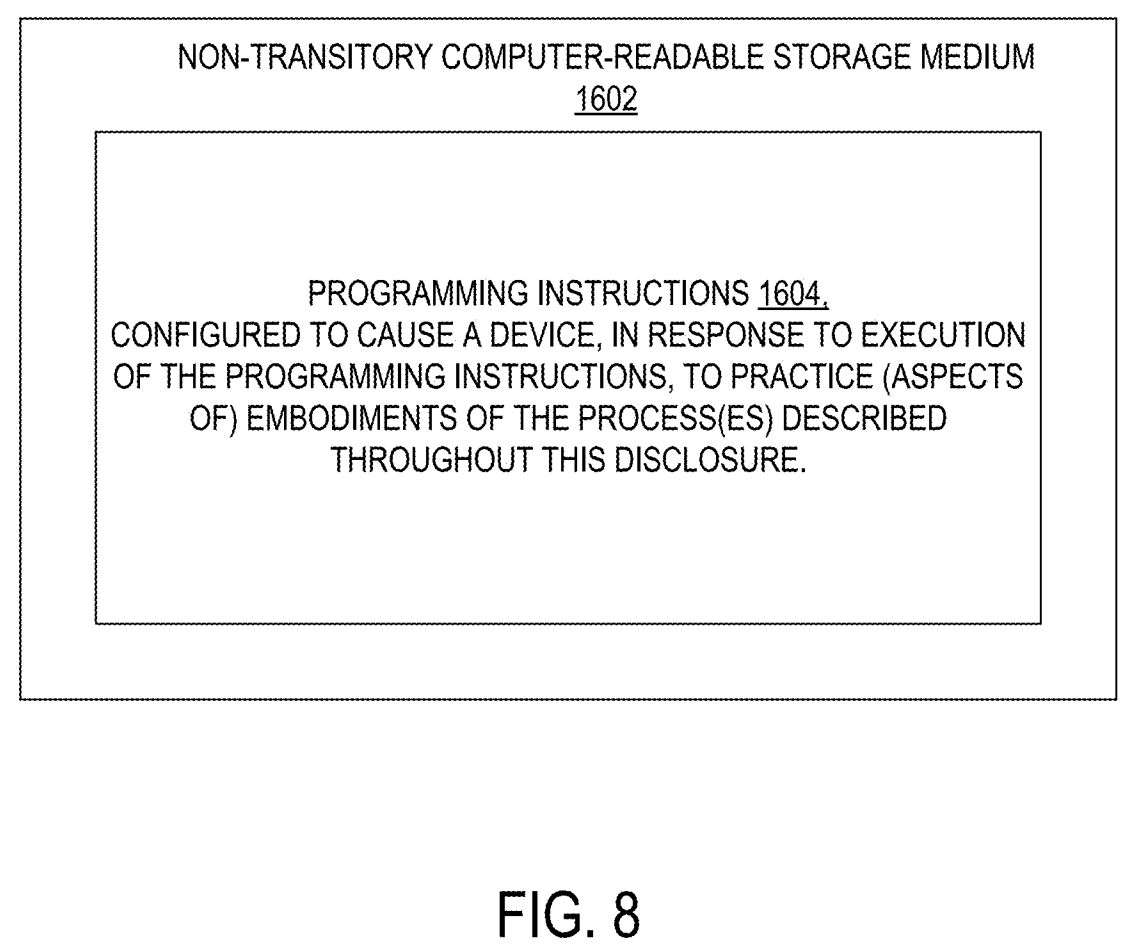

NON-TRANSITORY COMPUTER-READABLE STORAGE MEDIUM
1602

PROGRAMMING INSTRUCTIONS 1604,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 8

AUTOMATIC CALIBRATION OF BRAILLE INTERFACE

TECHNICAL FIELD

Disclosed embodiments are directed to braille interfaces, and specifically to algorithms for calibration of braille interfaces implemented on both touch interfaces and legacy keyboards.

BACKGROUND

By default, computing devices are designed around and equipped with interfaces that are most easily used by people with normal vision (corrected or uncorrected). To facilitate usage of computing devices, various techniques have been developed to help assist with sight-impaired usage. For example, many operating systems include screen readers, where text elements displayed on the operating system interface are read aloud. For inputting data, tactile keyboards, viz. keyboards equipped with individual keys for letters, are often equipped with tactile indicators of "home" keys, such as the letters F and J, and so may be used by vision impaired persons following some training. However, most modern mobile devices, such as smartphones and tablets, employ a virtual interface such as a graphic keyboard that is displayed on demand. Such keyboards lack tactile clues as to the position of letters, and accordingly may not be readily usable by a vision impaired person. As an alternative, vision-impaired persons may be able to input text using the braille system, where characters are represented in a 2×3 dot matrix, and thus requiring only six discrete locations or keys for text entry.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 1 illustrates touchpoints for braille system input and the braille patterns corresponding to letters A-Z.

FIG. 2A illustrates an example braille interface for a touchscreen device, according to various embodiments.

FIG. 2B illustrates a first example braille interface for a table-top device, according to various embodiments.

FIG. 2C illustrates a second example braille interface for a table-top device, according to various embodiments.

FIG. 8 is a block diagram of a computer-readable storage medium that can be used to implement some of the components of the system or methods disclosed herein, according to various embodiments.

DETAILED DESCRIPTION

Figures 3A, 3B, 3C:
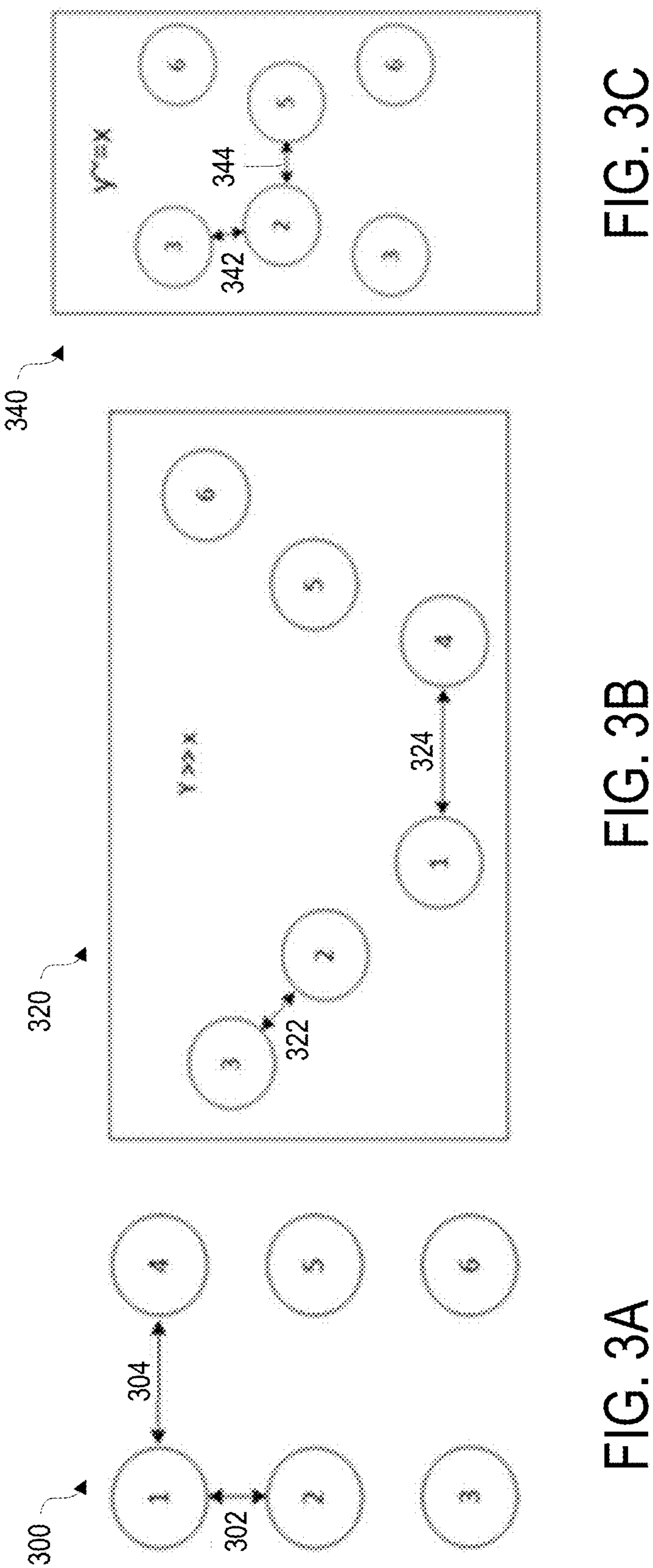
FIG. 3A illustrates the finger positions for entry of characters into a braille matrix.
FIG. 3B illustrates a first possible positioning of fingers on an example touchscreen interface, according to various embodiments.
FIG. 3C illustrates a second possible positioning of fingers on an example touchscreen interface, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The braille writing system is a tactile alphabet for the sight-impaired comprised of characters formed from a plurality of raised dots. A sight-impaired reader reads braille by lightly placing their fingers on the characters in sequence, enabling them to read words by feeling each individual character. Each character is formed from a 2×3 matrix of dots, with two columns of three dots each, with a unique pattern assigned to each character of the alphabet. FIG. 1 illustrates the braille patterns 102 for each of the 26 characters of the English alphabet.

FIG. 1 further illustrates the 2×3 braille matrix 104 that forms the basis for each character. As the 2×3 braille matrix only requires six dots, braille characters can be typed using three fingers on two hands, with the hands held in relatively static locations on a suitable interface. Interfaces designed specifically for braille input are available, but typically must be used with a computer device, such as computer device 1500 (FIG. 7, discussed below) that can accept accessories, e.g. a computer equipped with a USB port or similar interface. However, this requires that the user carry the interface with them, and further limits the user to carrying a suitably compatible device such as a laptop. Many mobile devices may not be able to accept an external braille interface.

To nevertheless allow use by vision impaired persons, mobile devices may offer a virtual or on-screen interface. The interface may be based on the braille matrix 104, with fingers corresponding to spots 1, 2, and 3 mapping to one hand, and fingers corresponding to spots 4, 5, and 6 mapping to the other hand. Thus, a vision impaired person could hold a device in two hands and place three fingers from each hand on the touch interface to input characters using braille patterns 102 corresponding to their respective letters.

However, different users of a device equipped to accept braille input according to braille matrix 104 may vary in how they contact the interface. A person having larger hands and/or longer fingers may preferably contact the interface in different locations than a person having smaller hands and/or shorter fingers. Where the interface is tactile, e.g. uses physical keys in fixed positions, each user may be required to adjust their hand position so that all keys are contacted, as positive contact with each key can be felt. In contrast, a touchscreen interface does not provide tactile clues for positioning of a user's fingers, so the interface must be capable of accommodating touch points in locations that differ between users. Furthermore, conventional physical interfaces, such as a keyboard, may be adapted for use as braille interfaces by remapping six keys of the keyboard to the braille matrix 104, and ignoring input from the remaining keys. As with a touchscreen interface, using a conventional keyboard for braille input can require the laptop or other device to accommodate different sets of keys depending upon the size and position of a given user's hands.

FIGS. 2A-2C illustrate various arrangements of fingers on interfaces for entering braille characters. FIG. 2A illustrates finger positions 200 for a typical user holding a device with a touchscreen interface, such as a smartphone. The device may be held with the touchscreen facing away from the user, with the index, middle, and ring fingers of each hand being positioned on the screen. FIG. 2B illustrates finger positions 220 for a typical user positioning hands on a keyboard such as a laptop or tablet keyboard, or on a tablet that is placed on a desk. The fingers of the left and right hands may thus angle relative to each other, forming a "V" pattern. Finally, FIG. 2C illustrates a linear arrangement 240 of fingers with a space bar, which may be similar to the arrangement of keys on a dedicated braille interface, or may be employed on a tabletop interface such as a laptop or desktop keyboard. It should be understood that at least FIGS. 2A and 2B illustrate interface positions that may vary from user to user, depending upon a given user's hand and finger size.

Because of being vision-impaired, a user may not be readily able to determine where to place their fingers on a touch interface to conform to a preset finger layout. While a conventional keyboard may provide some measure of tactile feedback for positioning, as mentioned above, a user still may wish to place their hands in a more ad hoc fashion to positions that are most comfortable for their hands and fingers. In either case, existing interfaces may require a calibration process prior to being used, where the computer device receiving the input first determines where each of the user's fingers are placed. A user may need to place all six fingers (e.g. three fingers from each hand) upon the interface for some predetermined amount of time so that the interface can determine which areas of the interface to map to each finger. Similarly, when the interface is a conventional keyboard, the user may need to depress their six desired keys during a calibration process.

This calibration process may be time consuming, needing to be performed at least once before a given user can begin entering braille characters on a given interface. In some instances, the calibration process may need to be performed each time the user interacts with the device. Depending on the device and any implementing software, the calibration procedure may require spoken instructions to complete, further increasing the time required before the user can use the interface to enter information.

Disclosed embodiments include methods and techniques for automatically calibrating an interface for braille characters for a given user as the user begins to enter characters. Thus, disclosed embodiments allow for braille interfaces that are essentially self-calibrating, not requiring an initial separate calibration step.

FIGS. 3A to 3C illustrate various finger positions corresponding to the dots of the 2×3 braille matrix that may be encountered when a user engages with an interface similar to finger positions 200 and 220 (FIGS. 2A and 2B, above). In embodiments, distances between finger presses and amount of surface touched (when the interface is a touchscreen) are measured and compared against the braille character set to determine the user's finger locations on the interface that correspond to the dots of the 2×3 braille matrix, thus calibrating the interface.

As can be seen in the configuration 300 of FIG. 3A, the height 302 between finger touches in each column of fingers 1-2-3, and 4-5-6, is less than the width 304 between finger touches in each row of fingers 1-4, 2-5, and 3-6. Likewise, the height 322 within each column is less than width 324 of each row, in configuration 320 of FIG. 3B. In configuration 340 of FIG. 3C, height 342 may be similar to width 344 in row 205, but is less than the widths of remaining rows 1-4 and 3-6. As will be understood, these height-width relationships are due to the grip of the typical user, where adjacent fingers in each column (1-2-3 and 4-5-6) are from the same hand and thus spaced closely, while fingers in each row (1-4, 2-5, and 3-6) are from different hands. Moreover, the space within rows may be at least partially determined by the size of the interface. Larger tablets and smartphones implementing the interface on a touch screen will naturally space a user's hands further apart, particularly when the device is held in a landscape orientation, viz. the device is gripped on each shorter side.

Figure 4:
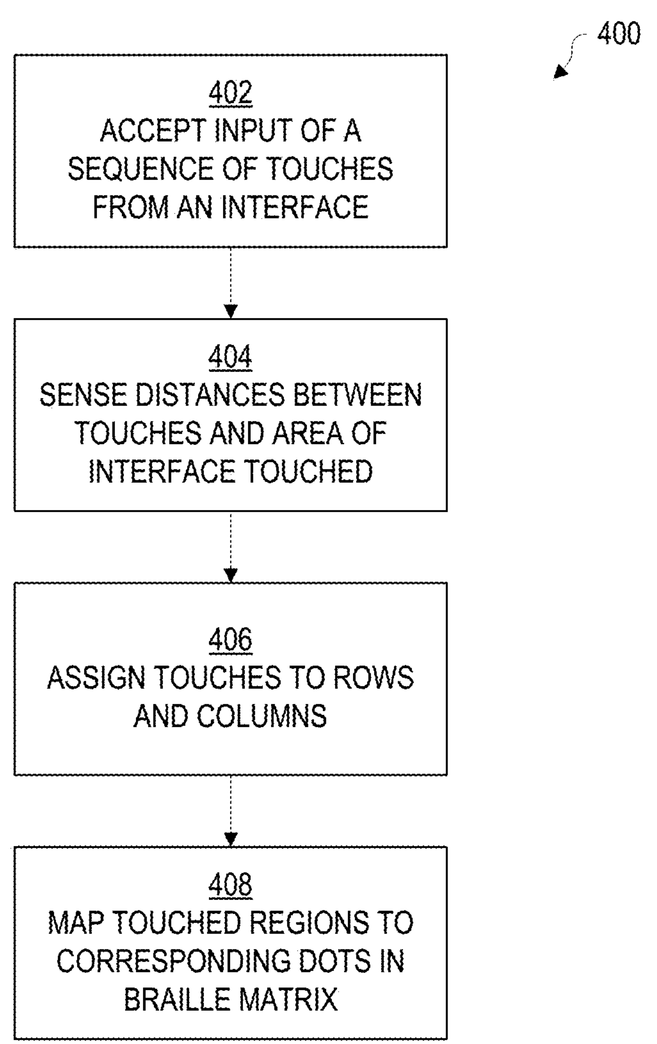
FIG. 4 is a flowchart of operations of an example method for automatic calibration of fingers on a braille interface, according to various embodiments.

This relationship of height to width on a given interface can, when referenced against the known dot patterns of the various braille characters, allow distinguishing of the rows and columns, and this for the interface to be calibrated. An example of this process of this calibration is laid out in the method 400 illustrated in FIG. 4, according to embodiments. Depending on the needs and specifics of a given implementation, each of the operations of method 400 may be performed in whole or in part, and some operations may be added or omitted.

In operation 402, in embodiments, input is accepted from an interface which comprises a sequence of touches that correspond to braille characters entered in a 2×3 matrix. The interface, as mentioned above, may be a touchscreen interface, as typically used on a mobile device, a physical keyboard, as typically used on a laptop or desktop computer, or another suitable interface that can be configured to accept braille matrix patterns. The sequence may be any series of characters, such as the start of a word, and may be more than one character. For example, a user may spell "THE", comprising of fingers 2-3-4-5 for "T", then 1-2-5 for "H", and 1-5 for "E", with reference to the finger numbering introduce in matrix 104, of FIG. 1. Depending on how a given braille interface is configured to accept input, each combination of fingers for each character may be pressed approximately simultaneously for a brief period of time, then changed or lifted to indicate the next letter. Thus, the typing user would essentially press three patterns, each pattern comprised of multiple simultaneous finger presses. Furthermore, three patterns are described merely for illustration, and should not be construed to be a minimum number of characters required to calibrate the interface. Depending on the specifics of a given embodiment, such as interface type, processing power, spacing of the user's fingers, and characters entered, more or less than three characters may be needed to accurately distinguish rows and columns, and allow calibration of the braille matrix.

In operation 404, distances between the touches comprising the input characters from operation 402 are detected, in embodiments. Furthermore, in some embodiments, the area of each touch may also be detected. For example, the character "A" comprises a single finger press, distinct from all other characters, so detection of a single finger press allows the implementing interface to immediately determine the position of finger 1. Entry of the character "B" comprises adjacent finger presses of one hand, e.g. fingers 1 and 2, and so allows determination of fingers comprising a column. Entry of the character "C" comprises adjacent finger presses of two hands, e.g. fingers 1 and 4, and so allows determination of fingers comprising a row. Still further, some patterns may have mirrors, e.g. the patterns for "R" and "W" are mirror images. Thus, it will be recognized that, depending on what a user enters, multiple characters may be required before a final calibration can be established. A user may need to enter a "B" and a "C" before an implementing system has enough information to distinguish columns and rows, as the distance between fingers in the two characters may be compared against each other. Entry of an "A" may allow orientation of the pattern due to its unique position as a single dot character. Where an interface is a physical keyboard, a user may place their index fingers on the "F" and "J" keys, in embodiments, referencing the ridges or dots typically present on the keys. The user's remaining middle and ring fingers can then be placed on any other keys, according to the user's comfort and/or preference. When the user begins typing, the distances between finger presses may be ascertained by referencing knowledge of the spacing between individual keys on the keyboard.

In some embodiments that employ touch-sensitive interfaces, finger positions and characters may be further distinguished by sensing the amount of surface of an interface that is contacted by a given finger. A middle finger, typically used as finger position 2 or 5, may have a greater amount of contact area than an index or ring finger, for example. Also, substantially identical touch areas in two different interface locations may indicate the same finger but on different hands, while fingers on a single hand will typically have different contact areas from each other. Thus, a letter "B" could be readily distinguished from a letter "C" without having to enter both and compare across characters, as the touches for letter "C" would be expected to have roughly similar contact areas, while "B" would be expected to be somewhat different. This distinguishing of fingers may allow orientation, in addition or alternative to the presence of a letter "A" or other unique pattern.

The foregoing may be useful for interfaces that may rest on a table, and not otherwise have an indication of orientation. Still further, in some embodiments, external sensors may be employed. Many mobile devices are equipped with spatial sensors that allow device orientation to be ascertained, such as accelerometers that allow a device to determine which direction is up. The orientation of the device in a user's hands, and thus the position of the user's hands, may be derived from touchpoints and orientation. Still further, some implementing embodiments may have predictive typing, autocorrect, and/or similar types of interface automation, which may analyze a sequence of presses to predict likely words. This predictive technology may be used to help drive distinguishing characters and improve calibration accuracy. For example, a sequence of characters where some patterns may have mirrors may be distinguished by fitting potential characters to a predictive dictionary, and selecting the character from the set of mirror possibilities that best fits the predictive dictionary results. This cross-check with extrinsic information can improve the speed and accuracy of the resultant calibration.

In operation 406, the distances are used to determine and assign fingers to rows and columns. Each of the six fingers maps to one row and one column. In operation 408, in embodiments, once fingers comprising rows and columns have been ascertained, zones or physical keys of the interface (whether touchscreen or physical) are assigned to their identified positions within the braille matrix. Touches may then be subsequently directly processed into corresponding characters. User touches initially received during calibration may be buffered, and subsequently entered as their appropriate characters once calibration is completed. From the user's perspective, the calibration happens seamlessly; the user simply starts typing, and the interface provides calibration within several characters.

Figure 5:
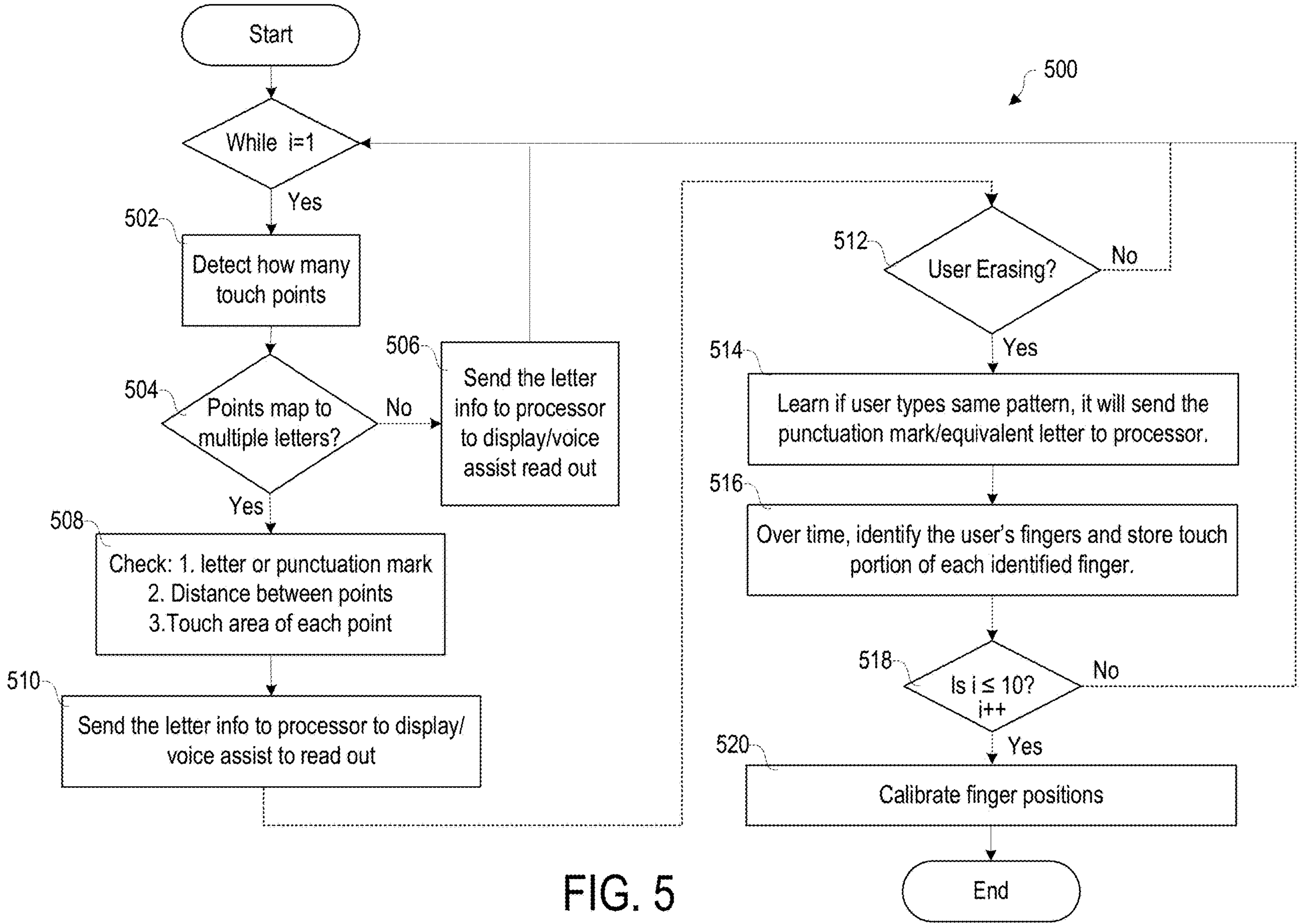
FIG. 5 is a flowchart of operations of an example method for analysis of a sequence of braille characters to determine a calibration for an interface, according to various embodiments.

FIG. 5 is a flowchart of operations for a method 500 according to some embodiments, which may be used to calibrate a touch-based braille interface. Method 500 may comprise an implementation of method 400. Depending on the needs and specifics of a given implementation, each of the operations of method 500 may be performed in whole or in part, and some operations may be added or omitted. Method 500, in embodiments, is an iterative process as will be described below, to be performed once a braille interface has been selected or otherwise invoked.

In operation 502, a user of an implementing system, such as computer device 1500, may begin typing braille characters on an interface. The system, in embodiments, detects one or more touch points, and determines the number of points of contact.

In operation 504, in embodiments, the system determines whether the detected touch points map to only one possible braille character (such as the letter "A" or another letter with a unique pattern that cannot easily be confused with another pattern) or multiple possible characters, as can be seen in FIG. 1 and described above with respect to operation 404 of FIG. 4. If it is determined that the touch points map to one unique character, method 500 proceeds to operation 506, where the touch points may be sent to a processor, which may enter the character into the currently running app and/or otherwise cause the character to be displayed, read out loud (such as via a voice assist), or both.

If multiple possible braille characters could be matched to the touch points, method 500 proceeds to operation 508. In operation 508, the touch points are evaluated against the various braille characters 102 (FIG. 1) to determine the characters that likely match the touch points, and whether each likely matching character is a letter or punctuation mark. Further, the touch points are evaluated for distance between each touch point, as well as the contact area of each touch point. Based at least in part on this information, the implementing system selects a best possible match from the identified possible matching characters. Once selected, in operation 510, the likely match is provided to the processor to be displayed and/or read out loud.

Following display/read-out, in operation 512 the system determines whether the user is erasing the character, in embodiments. The user may potentially erase the character in response to the read-out, if the likely match is not what the user had intended to enter. Alternatively, the user may have typed the character in error. If the user has not erased the character, the character is deemed correct, and the process flow reverts back to operation 502, as can be seen in the depicted embodiment.

In operation 514, if the implementing system determines that the user erased the entered character, depending upon the embodiment, the system may evaluate subsequent entries to determine if the deletion was due to the user entering the wrong character (e.g. a typo), or if the deletion was due to the system matching to an incorrect character as part of the calibration process. For example, the user may delete the character and then enter a distinctly different pattern, indicating that the user entered the character in error. In such an event, the system may mark the deleted character as a correct match for subsequent calibration. However, if the user enters a pattern that is substantially similar or comparable to the initial match, in some embodiments the system may select the next most likely matching character, and if the next most likely pattern is not deleted, correlate the user's particular pattern with the character. With this correlation, the system can further determine where the user has positioned their fingers and use this information for calibration.

In operation 516, the system aggregates information from each entered character and matched pattern to identify and distinguish each of the user's fingers, e.g. left index, left middle, left ring, right index, right middle, right ring. Information may include points 2 and 3 collected from operation 508, namely, the distance between touch point locations and the area of each touch point. As noted above in operation 514, patterns that are correctly matched to characters can assist the system in more readily identifying each of the user's fingers, their contact area, and their spacing.

In operation 518, the method 500 may iterate through several characters before finalizing a calibration. In the depicted example, method 500 may iterate through at least 10 entered characters before proceeding to finalize calibration. Other embodiments may iterate through fewer or more characters, while still other embodiments may use a variable number of iterations, instead finalizing calibration when enough information has been obtained from multiple different characters to allow the user's fingers to be identified with a degree of confidence above some predetermined level.

In operation 520, once sufficient information on the user's finger spacing and position has been obtained from the various entered characters, the finger positions are calibrated for the interface. Once calibration has been achieved, the implementing system may end further calibration operations. Ending calibration operations may free up resources for the implementing system and/or increase the speed at which the interface accepts characters. In other embodiments, the calibration process may not full cease, but rather continue with analysis of entered characters to refine the calibration and/or compensate for if the user shifts their hand position.

Figure 6:
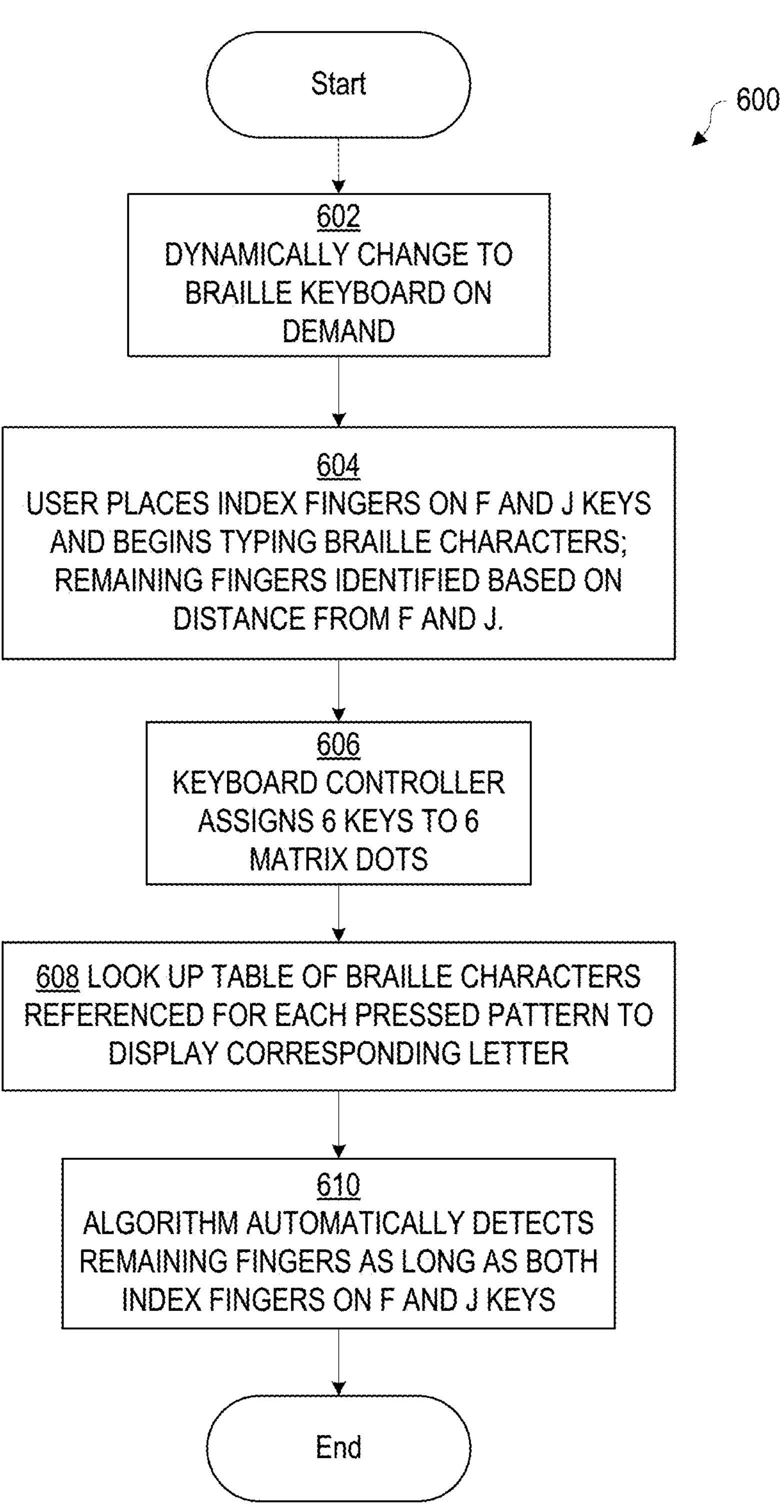
FIG. 6 is a flowchart of operations of an example method for calibration of a tactile or keyboard interface, according to various embodiments.

FIG. 6 is a flowchart of operations for a method 600 according to some embodiments, which may be used to calibrate a tactile-based braille interface, such as a physical keyboard. Depending on the needs and specifics of a given implementation, each of the operations of method 600 may be performed in whole or in part, and some operations may be added or omitted. It should be understood that the physical keyboard may be a legacy mechanical keyboard without touch capability, or may be a hybrid keyboard that includes both mechanical keys and touch sensitivity. Depending on the configuration of such a hybrid keyboard, either method 600 for calibrating of a tactile interface or method 500 for calibrating a touch-based interface may be employed, or possibly a combination of both where some finger presses may be on mechanical keys and some may be on a touch interface.

In operation 602 in embodiments, a device with a physical keyboard, such as a laptop, desktop, or tablet equipped to a physical keyboard, may be requested to dynamically shift to a braille keyboard. The request may be made by any suitable mechanism, such as a toggle or other interface that may be readily useable by a vision-impaired user. In some embodiments, the toggle or interface may be a voice assistant, such as Siri®, Alexa®, Google® Assistant, Cortana® or another similar service, or may be physical switch, such as a dedicated key on a keyboard. In still other embodiments, the implementing computer device, such as a computer device 1500, may be able to detect multiple simultaneous key presses that indicate a user is attempting to enter braille characters, and automatically switch to a braille interface. Once braille entry is detected or a braille keyboard is requested, the computer device may initiate an automatic calibration process, as described herein.

In operation 604, a user of the braille keyboard may place their index fingers on the F and J keys. As is known, most physical keyboards include a bump or other tactile indicator on the F and J keys to guide typists to home keys for index fingers, for touch typing. These same tactile indicators can thus serve the same function for braille entry, with a user placing their index fingers on the tactile indicators. Furthermore, typical physical keyboards have discrete keys that stand proud above a substrate, further allowing a vision-impaired user to not only locate keys on which to place their index fingers, but also to tactilely determine the edges of each key, allowing the user's index fingers to be placed correctly over each key.

Once the user has located their index fingers on the F and J keys, the user may place their middle and ring fingers on keys proximate to the F and J keys. For example, depending on the size and length of a user's hands and fingers as well as the position of the user's arms relative to the keyboard, the user's fingers may touch the keyboard at an angle, with some fingers contacting keys in the row or rows above the row with the F/J keys. Other users may place their fingers on other keys within the F/J row.

In operation 606, in embodiments, the user may begin typing. A keyboard controller may associated with the keyboard may identify the particular keys that the user is depressing, and initially assign each of the six keys to one of the six braille matrix dots.

In operation 608, the implementing system may employ a look-up table of braille characters, and reference each entered pattern (as a series of simultaneous or nearly simultaneous keystrokes) to a corresponding character.

In operation 610, the implementing system may detect if the user is depressing keys that do not correspond to the initial mapping to the braille matrix, performed in operation 606. If the system detects different keys being depressed, the system may then reassign or otherwise remap the actual keys being depressed to the braille matrix.

Figure 7:
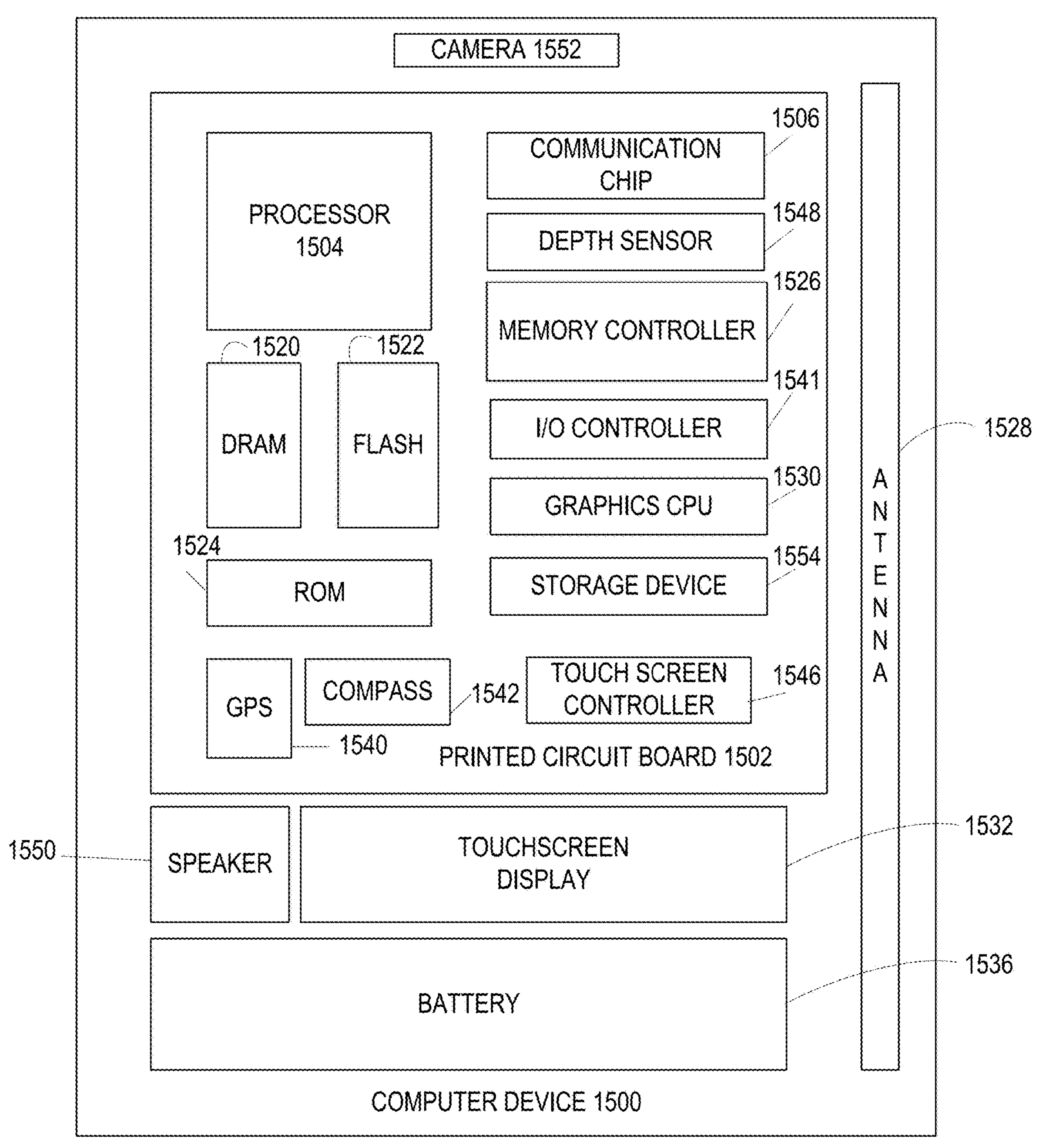
FIG. 7 is a block diagram of an example computer that can be used to implement some or all of the components of the disclosed systems and methods, according to various embodiments.

FIG. 7 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of method 400, 500, and/or 600 described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) method 400, 500, and/or 600 described above. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

EXAMPLES

The following examples pertain to further embodiments.

Example 1 is a method for calibrating a touch screen for a braille interface, comprising accepting, from an interface, an input from a user comprised of a sequence of finger touches on a plurality of regions of the interface, the sequence of finger touches corresponding to one or more braille characters; sensing, from the input, distances between individuals of the finger touches on different regions of the plurality of regions; and mapping, from the sensed distances, individuals of the plurality of regions to corresponding dots in a 2×3 braille matrix.

Example 2 includes the subject matter of example 1, or some other example herein, wherein sensing the distance between individuals of the finger touches comprises distinguishing between rows and columns.

Example 3 includes the subject matter of example 1 or 2, or some other example herein, wherein distinguishing between rows and columns comprises comparing distances between finger touches, and assigning rows where two finger touches are comparatively close together, and columns where two finger touches are comparatively spaced apart.

Example 4 includes the subject matter of any of examples 1-3, or some other example herein, wherein the compared distances are based at least in part on a spacing represented by the 2×3 braille matrix.

Example 5 includes the subject matter of any of examples 1-4, or some other example herein, wherein sensing distances between individuals of the finger touches further comprises measuring an amount of finger area touching the interface.

Example 6 is a computer readable medium (CRM) comprising instructions that, when executed by an apparatus, cause the apparatus to accept, from an interface equipped to the apparatus, a sequence of finger touches on a plurality of regions of the interface, the sequence of finger touches corresponding to one or more braille characters; sense, from the input, distances between individuals of the finger touches on different regions of the plurality of regions; and map, from the sensed distances, individuals of the plurality of regions to corresponding dots in a 2×3 braille matrix.

Example 7 includes the subject matter of example 6, or some other example herein, wherein the instructions are to further cause the apparatus to distinguish between rows and columns based on the sensed distances.

Example 8 includes the subject matter of example 7, or some other example herein, wherein the instructions are to further cause the apparatus to distinguish between the rows and columns by comparing distances between finger touches; assign rows where two finger touches are comparatively close together; and assign columns where two finger touches are comparatively spaced apart.

Example 9 includes the subject matter of any of examples 6-8, or some other example herein, The CRM of claim 8, wherein the instructions are to further cause the apparatus to compare the distances based at least in part on a spacing represented by the 2×3 braille matrix.

Example 10 includes the subject matter of any of examples 6-9, or some other example herein, wherein the instructions are to further cause the apparatus to measure an amount of finger area touching the interface, and map the individuals of the plurality of regions based in part on the amount of finger area touching the interface.

Example 11 includes the subject matter of any of examples 6-10, or some other example herein, wherein the interface is a touch-screen interface.

Example 12 includes the subject matter of any of examples 6-11, or some other example herein, wherein the apparatus is a smartphone, tablet, or mobile device.

Example 13 includes the subject matter of any of examples 6-12, or some other example herein, wherein the interface is a keyboard.

Example 14 is an apparatus, comprising a user interface responsive to multiple simultaneous finger inputs; a processor; and instructions executable by the processor to cause the processor to accept, from an interface equipped to the apparatus, a sequence of finger inputs on a plurality of regions of the interface, the sequence of finger inputs corresponding to one or more braille characters; sense, from the inputs, distances between individuals of the fingers on different regions of the plurality of regions; and map, from the sensed distances, individuals of the plurality of regions to corresponding dots in a 2×3 braille matrix.

Example 15 includes the subject matter of example 14, or some other example herein, wherein the instructions are to further cause the processor to distinguish between rows and columns based on the sensed distances.

Example 16 includes the subject matter of example 14 or 15, or some other example herein, wherein the instructions are to cause the processor to measure an amount of finger area touching the interface, and map the individuals of the plurality of regions based in part on the amount of finger area touching the interface.

Example 17 includes the subject matter of example 15 or 16, or some other example herein, wherein the instructions are to cause the processor to distinguish between the rows and columns by comparing distances between finger touches; assign rows where two finger touches are comparatively close together; and assign columns where two finger touches are comparatively spaced apart.

Example 18 includes the subject matter of any of examples 14-17, or some other example herein, wherein the interface is a keyboard.

Example 19 includes the subject matter of any of examples 14-18, or some other example herein, wherein the interface is a touch screen.

Example 20 includes the subject matter of any of examples 14-19, or some other example herein, wherein the apparatus is a mobile device.

What is claimed is:

1. A method for calibrating a touch screen for a braille interface, comprising:

accepting, from an interface, an input from a user comprised of a sequence of finger touches on a plurality of regions of the interface, the sequence of finger touches corresponding to one or more braille characters;

sensing, from the input, distances between individuals of the finger touches on different regions of the plurality of regions; and mapping, from the sensed distances, individuals of the plurality of regions to corresponding dots in a 2×3 braille matrix.

2. The method of claim 1, wherein sensing the distance between individuals of the finger touches comprises distinguishing between rows and columns.

3. The method of claim 2, wherein distinguishing between rows and columns comprises comparing distances between finger touches, and assigning rows where two finger touches are comparatively close together, and columns where two finger touches are comparatively spaced apart.

4. The method of claim 3, wherein the compared distances are based at least in part on a spacing represented by the 2×3 braille matrix.

5. The method of claim 1, wherein sensing distances between individuals of the finger touches further comprises measuring an amount of finger area touching the interface.

6. A non-transitory computer readable medium (CRM) comprising instructions that, when executed by an apparatus, cause the apparatus to:

accept, from an interface equipped to the apparatus, a sequence of finger touches on a plurality of regions of the interface, the sequence of finger touches corresponding to one or more braille characters;

sense, from the input, distances between individuals of the finger touches on different regions of the plurality of regions; and map, from the sensed distances, individuals of the plurality of regions to corresponding dots in a 2×3 braille matrix.

7. The CRM of claim 6, wherein the instructions are to further cause the apparatus to distinguish between rows and columns based on the sensed distances.

8. The CRM of claim 7, wherein the instructions are to further cause the apparatus to:

distinguish between the rows and columns by comparing distances between finger touches;

assign rows where two finger touches are comparatively close together; and assign columns where two finger touches are comparatively spaced apart.

9. The CRM of claim 8, wherein the instructions are to further cause the apparatus to compare the distances based at least in part on a spacing represented by the 2×3 braille matrix.

10. The CRM of claim 6, wherein the instructions are to further cause the apparatus to measure an amount of finger area touching the interface, and map the individuals of the plurality of regions based in part on the amount of finger area touching the interface.

11. The CRM of claim 6, wherein the interface is a touch-screen interface.

12. The CRM of claim 11, wherein the apparatus is a smartphone, tablet, or mobile device.

13. The CRM of claim 6, wherein the interface is a keyboard.

14. An apparatus, comprising:

a user interface responsive to multiple simultaneous finger inputs;

a processor; and instructions executable by the processor to cause the processor to:

accept, from an interface equipped to the apparatus, a sequence of finger inputs on a plurality of regions of the interface, the sequence of finger inputs corresponding to one or more braille characters;

sense, from the inputs, distances between individuals of the fingers on different regions of the plurality of regions; and map, from the sensed distances, individuals of the plurality of regions to corresponding dots in a 2×3 braille matrix.

15. The apparatus of claim 14, wherein the instructions are to further cause the processor to distinguish between rows and columns based on the sensed distances.

16. The apparatus of claim 14, wherein the instructions are to cause the processor to measure an amount of finger area touching the interface, and map the individuals of the plurality of regions based in part on the amount of finger area touching the interface.

17. The apparatus of claim 16, wherein the instructions are to cause the processor to:

distinguish between the rows and columns by comparing distances between finger touches;

assign rows where two finger touches are comparatively close together; and assign columns where two finger touches are comparatively spaced apart.

18. The apparatus of claim 14, wherein the interface is a keyboard.

19. The apparatus of claim 14, wherein the interface is a touch screen.

20. The apparatus of claim 19, wherein the apparatus is a mobile device.

* * * * *